United States Patent
Ise et al.

(10) Patent No.: US 10,218,005 B2
(45) Date of Patent: Feb. 26, 2019

(54) SECONDARY BATTERY, BATTERY PACK, AND VEHICLE

(71) Applicant: KABUSHIKI KAISHA TOSHIBA, Minato-ku (JP)

(72) Inventors: Kazuki Ise, Kawasaki (JP); Yasunobu Yamashita, Tokyo (JP); Shinsuke Matsuno, Tokyo (JP); Norio Takami, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/445,057

(22) Filed: Feb. 28, 2017

(65) Prior Publication Data

US 2018/0083286 A1    Mar. 22, 2018

(30) Foreign Application Priority Data

Sep. 16, 2016  (JP) .................................. 2016-181363

(51) Int. Cl.
   *H01M 14/00*    (2006.01)
   *H01M 4/66*    (2006.01)
   (Continued)

(52) U.S. Cl.
   CPC ......... *H01M 4/667* (2013.01); *B60L 11/1851* (2013.01); *H01M 2/305* (2013.01);
   (Continued)

(58) Field of Classification Search
   CPC ...... H01M 4/667; H01M 4/0442; H01M 4/38; H01M 4/48; H01M 4/485; H01M 4/505;
   (Continued)

(56) References Cited

U.S. PATENT DOCUMENTS

| H1721 H | 4/1998 | Wainwright |
| 6,403,253 B1 | 6/2002 | Wainwright et al. |

(Continued)

FOREIGN PATENT DOCUMENTS

| CA | 2186099 A1 | 11/1996 |
| CN | 103928681 B | 7/2016 |

(Continued)

OTHER PUBLICATIONS

Korean Office Action dated Jul. 11, 2017 in Korean Patent Application No. 10-2017-0024750.

(Continued)

*Primary Examiner* — Jane J Rhee
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode, and an electrolyte including a water-containing solvent and a lithium ion. The negative electrode includes an aluminum-containing negative electrode current collector and a boehmite-containing cover layer, and the boehmite-containing cover layer is provided on at least a part of a surface of the negative electrode current collector, and has a thickness of 10 nm to 1000 nm.

13 Claims, 9 Drawing Sheets

(51) Int. Cl.

| | |
|---|---|
| *B60L 11/18* | (2006.01) |
| *H01M 2/30* | (2006.01) |
| *H01M 4/04* | (2006.01) |
| *H01M 4/485* | (2010.01) |
| *H01M 4/505* | (2010.01) |
| *H01M 4/62* | (2006.01) |
| *H01M 10/36* | (2010.01) |
| *H01M 10/42* | (2006.01) |
| *H01M 4/38* | (2006.01) |
| *H01M 4/48* | (2010.01) |
| *H01M 4/02* | (2006.01) |

(52) U.S. Cl.
CPC ........... *H01M 4/0442* (2013.01); *H01M 4/38* (2013.01); *H01M 4/48* (2013.01); *H01M 4/485* (2013.01); *H01M 4/505* (2013.01); *H01M 4/623* (2013.01); *H01M 4/625* (2013.01); *H01M 4/661* (2013.01); *H01M 4/664* (2013.01); *H01M 10/36* (2013.01); *H01M 10/425* (2013.01); *H01M 4/0404* (2013.01); *H01M 2004/021* (2013.01); *H01M 2004/027* (2013.01); *H01M 2004/028* (2013.01); *H01M 2220/20* (2013.01); *H01M 2300/0002* (2013.01)

(58) Field of Classification Search
CPC ...... H01M 4/623; H01M 4/625; H01M 4/661; H01M 4/664; H01M 4/0404; H01M 2/305; H01M 2004/021; H01M 2004/028; H01M 2004/027; H01M 2220/20; H01M 2300/0002; H01M 10/36; H01M 10/425
See application file for complete search history.

(56) References Cited

U.S. PATENT DOCUMENTS

| | | | |
|---|---|---|---|
| 6,787,266 | B1* | 9/2004 | Hashimoto ........... H01M 4/139 |
| | | | 29/623.5 |
| 2013/0004799 | A1 | 1/2013 | Bang et al. |
| 2014/0120380 | A1* | 5/2014 | Inagaki ................. C01G 33/00 |
| | | | 429/7 |
| 2017/0271717 | A1 | 9/2017 | Yamashita et al. |

FOREIGN PATENT DOCUMENTS

| | | |
|---|---|---|
| JP | 9/508490 A | 8/1997 |
| JP | 2004-362837 A | 12/2004 |
| JP | 3959708 | 8/2007 |
| JP | 2008-103132 A | 5/2008 |
| JP | 4250809 | 4/2009 |
| JP | 4492039 | 6/2010 |
| JP | 2017-174809 A | 9/2017 |
| KR | 10-1209461 B1 | 12/2012 |
| KR | 10-2016-0028826 A | 3/2016 |

OTHER PUBLICATIONS

Extended European Search Report dated Apr. 24, 2017 in Patent Application No. 17157591.3.
S. Liu, et al., "Rechargeable Aqueous Lithium-Ion Battery of $TiO_2/LiMn_2O_4$ with a High Voltage", Journal of The Electrochemical Society, 2011, 8 pgs.
H. D. Ruan, et al., "Comparison of Raman spectra in characterizing gibbsite, bayerite, diaspore and boehmite", Journal of Raman Spectroscopy, vol. 32, 2001, 6 pgs.

* cited by examiner

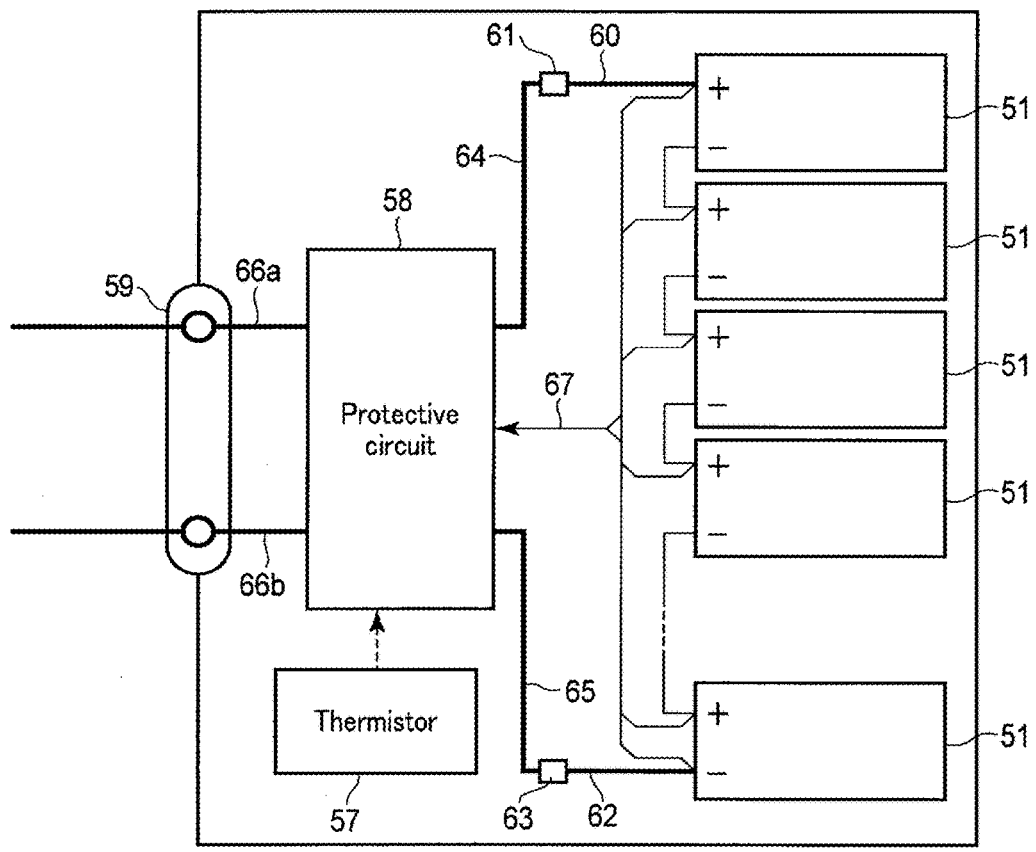
F I G. 5

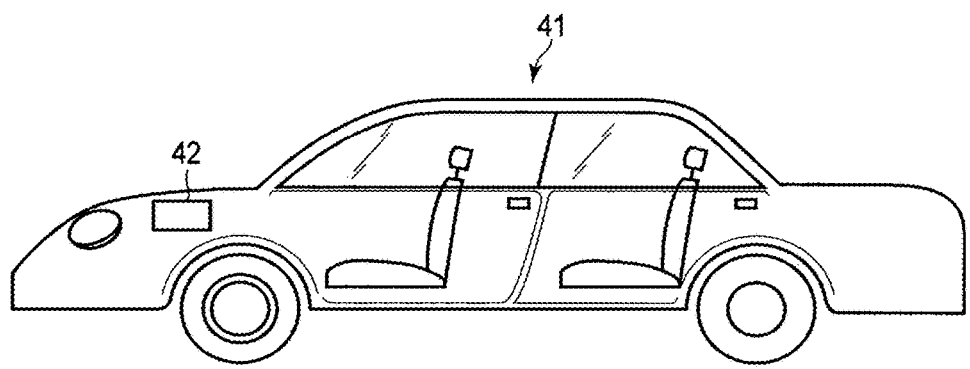
F I G. 6
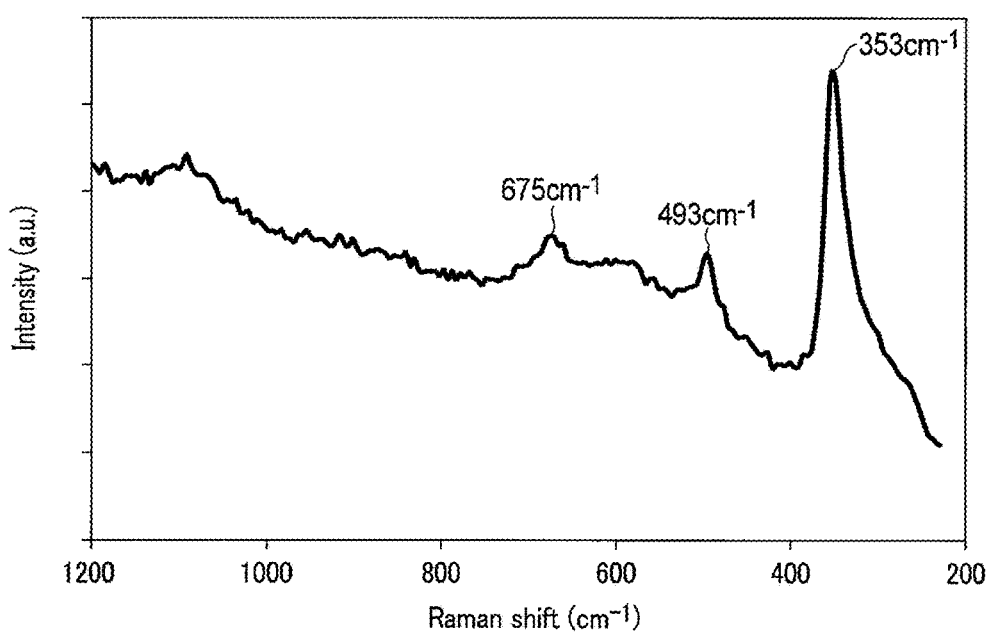
F I G. 7

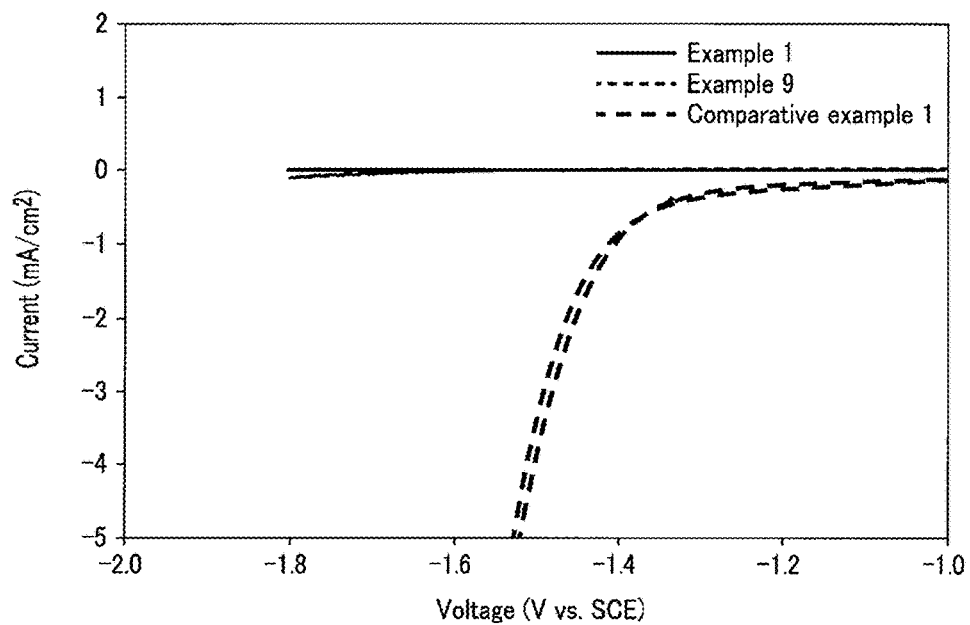
F I G. 10
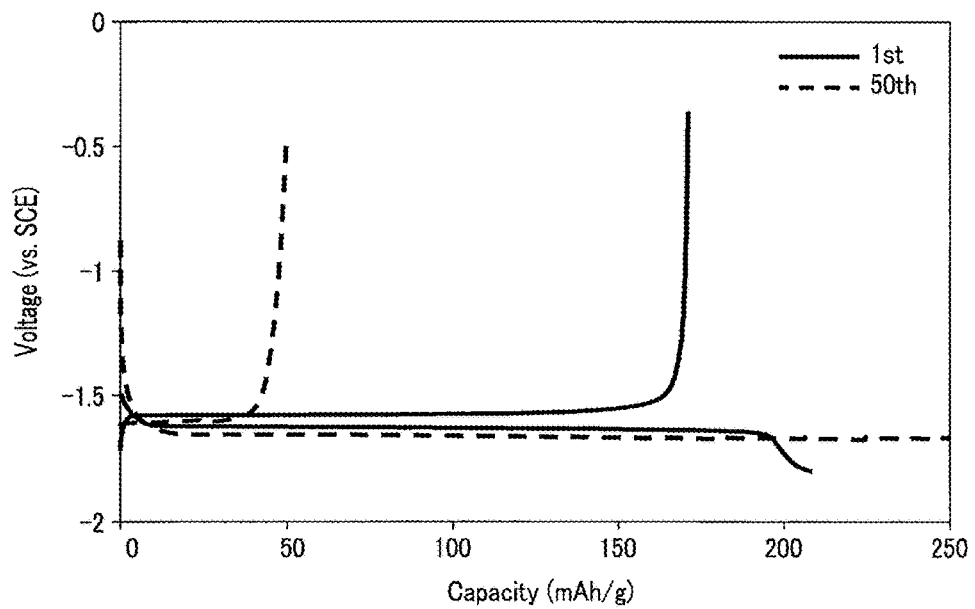
F I G. 11

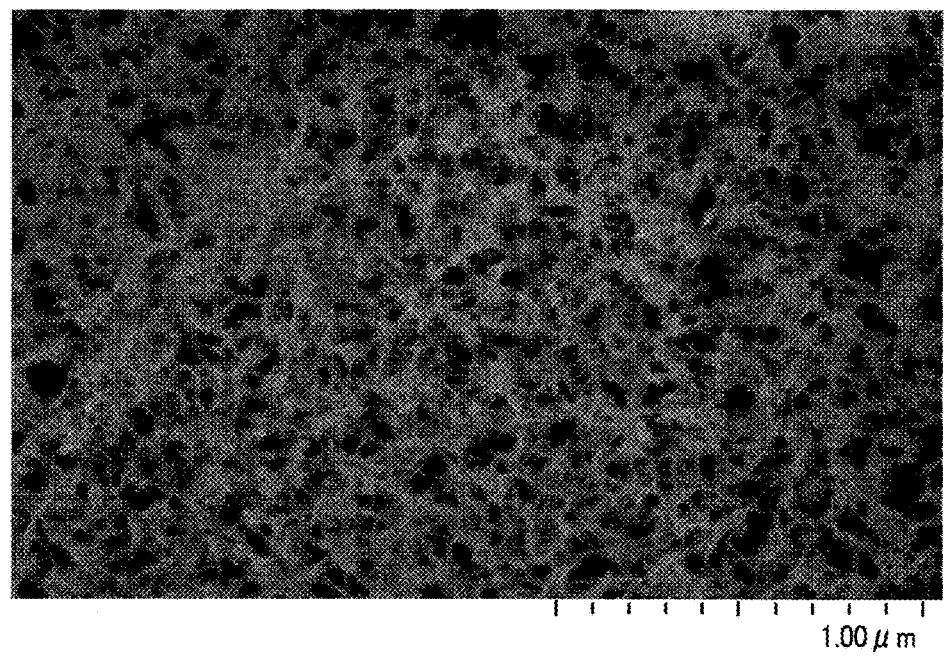
F I G. 12
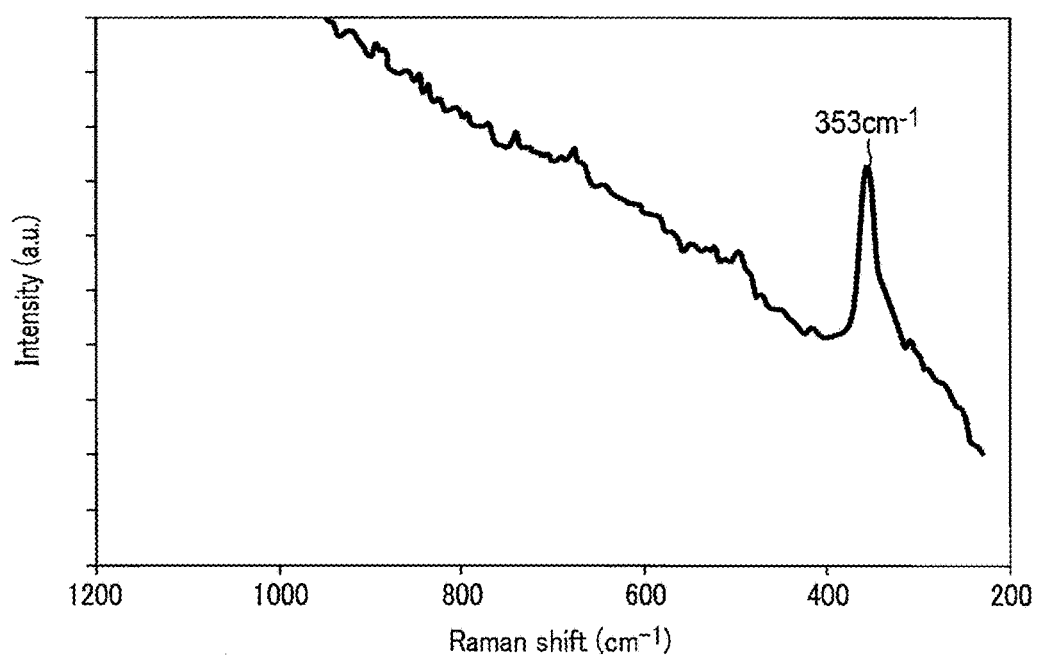
F I G. 13

SECONDARY BATTERY, BATTERY PACK, AND VEHICLE

CROSS-REFERENCE TO RELATED APPLICATION

This application is based upon and claims the benefit of priority from prior Japanese Patent Application No. 2016-181363, filed Sep. 16, 2016, the entire contents of which are incorporated herein by reference.

FIELD

Embodiments of the invention relate to a secondary battery, a battery pack, and a vehicle.

BACKGROUND

Recently, a battery formed using a nonaqueous solvent such as a lithium ion secondary battery has been developed as a battery having a high energy density. The lithium ion secondary battery is excellent in energy density and cycle characteristics compared to a lead storage battery and a nickel hydrogen secondary battery, and is expected to be used as a power source for large electricity storage, such as a power source for vehicles such as hybrid vehicles and electric vehicles. From the viewpoint of providing a large potential window, a nonaqueous solvent such as ethylene carbonate, diethyl carbonate or propylene carbonate is used as an electrolyte solution of the lithium ion secondary battery. Since these solvents are flammable, there are safety problems. If each of the solvents can be replaced with an aqueous electrolyte solution, it is possible to basically solve the problems. The aqueous electrolyte solution is inexpensive, compared to a nonaqueous electrolyte solution. Further, it is not necessary that a production process is performed in an inert atmosphere. Therefore, the nonaqueous electrolyte solution is replaced with the aqueous electrolyte solution, whereby a large cost reduction is expected.

However, there is a large problem in the use of the aqueous electrolyte solution for the lithium ion secondary battery. The problem is that the theoretical decomposition voltage calculated by the chemical equilibrium of water is 1.23 V, and thus a battery is configured to have a design voltage which is greater than the above voltage, whereby oxygen generates in a positive electrode and hydrogen generates in a negative electrode. In order to solve the problem, the oxygen overvoltage is increased at the oxidation side (positive electrode side) and the hydrogen overvoltage is increased at the reduction side (negative electrode side). From the viewpoint of kinetics, it is necessary to improve the design of the battery.

In the lithium ion secondary battery formed by using an aqueous solution, the charge/discharge process of the positive electrode is relatively easy. There are many reported examples of positive electrode active materials such as $LiCoO_2$, $LiMn_2O_4$, and $LiFePO_4$. Meanwhile, there are reported examples of negative electrode active materials having a lithium insertion/extraction potential of about −0.5 V (vs. SHE), such as $LiTi_2(PO_4)_3$, $TiP_2O_7$, and $VO_2(B)$. However, there are few reported examples of active materials which operate at a potential lower than the above potential. This is due to the fact that it is difficult to charge/discharge because the generation of hydrogen proceeds in the negative electrode. Even when a battery is formed using each of the above-described active materials as the negative electrode active material, the average operating potential is less than 2 V. In this case, it is difficult to allow the battery to have a high energy density. Currently, there is no aqueous secondary battery which has an energy density greater than that of the lead storage battery or the nickel hydrogen secondary battery. For example, if a lithium ion secondary battery using an aqueous solution can be formed by using $TiO_2$ or $Li_4Ti_5O_{12}$ having a lower lithium insertion/extraction potential, it is possible to achieve a high energy density.

BRIEF DESCRIPTION OF THE DRAWINGS

FIG. 5 is a block diagram showing an electric circuit of the battery pack of FIG. 4;

FIG. 6 is a cross-sectional view schematically showing an example of a vehicle according to a third embodiment;

FIG. 7 is a Raman spectrum according to a surface of a current collector of Example 1;

FIG. 10 is a graph showing the results of cyclic voltammetry according to Examples and Comparative example 1;

FIG. 11 is a graph showing a constant current charge/discharge curve according to Example 1;

FIG. 12 is a photograph showing an SEM observation image according to a surface of a current collector of Example 9; and FIG. 13 is a Raman spectrum according to the surface of the current collector of Example 9.

DETAILED DESCRIPTION

Figure 1:
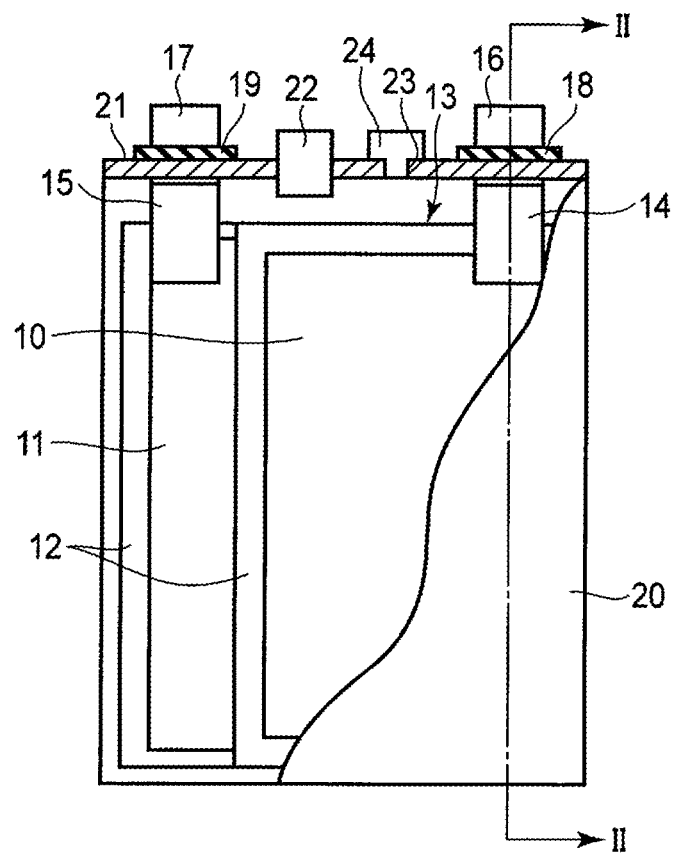
FIG. 1 is a cross-sectional view schematically showing an example of a rectangular secondary battery according to a first embodiment.

According to a first embodiment, a secondary battery is provided. The secondary battery includes a positive electrode, a negative electrode, and an electrolyte including a water-containing solvent and a lithium ion. The negative electrode includes an aluminum-containing negative electrode current collector and a boehmite-containing cover layer, and the boehmite-containing cover layer is provided on at least a part of a surface of the negative electrode current collector, and has a thickness of 10 nm to 1000 nm.

According to a second embodiment, a battery pack is provided. The battery pack includes the secondary battery according to the first embodiment.

According to a third embodiment, a vehicle is provided. The vehicle includes the battery pack according to the second embodiment.

First Embodiment

According to a first embodiment, a secondary battery is provided. The secondary battery includes a positive electrode, a negative electrode, and an electrolyte including a water-containing solvent and a lithium ion. The negative electrode includes an aluminum-containing negative electrode current collector and a boehmite-containing cover layer, and the boehmite-containing cover layer is provided on at least a part of a surface of the negative electrode current collector, and has a thickness of 10 nm to 1000 nm.

A boehmite-containing cover layer is provided on at least a part of a surface of the current collector so that the hydrogen overvoltage can be increased as compared to the case where the cover layer is not formed. Although the reason is not certain, the present inventors consider as follows. The boehmite has a structure in which its surface is terminated with a hydroxyl group. It is considered that when hydrogen occurs, a proton is adsorbed to the hydroxyl group and electrons are supplied from the electrode to the proton, thereby generating hydrogen. At this time, it is assumed that any one of the adsorption of the proton to the hydroxyl group, the transfer of electrons from the electrode, and the hydrogen generating reaction is slow from the kinetic viewpoint. In addition, it is assumed that anions and/or cations in an electrolyte are physically adsorbed to the hydroxyl group on the surface of boehmite. When anions and/or cations in the electrolyte are adsorbed to the hydroxyl group, the proton is hardly adsorbed to the hydroxyl group. As a result, it is considered that the hydrogen overvoltage is increased.

Furthermore, boehmite is a chemically stable material such that it functions as a passivation film. It is considered that the boehmite stably exists without causing corrosion and changing its structure in the case where the potential is shifted to a reducing side (in the case where the potential is low).

When the hydrogen overvoltage is increased, it is possible to suppress the generation of hydrogen from the current collector and the elution of metal ions from the current collector caused thereby in the case of using a negative electrode material having a low potential (such as a titanium oxide or a lithium titanium oxide) as the negative electrode active material. Therefore, it is possible to prevent the peeling of the active material layer from the negative electrode current collector. That is, a secondary battery can be stably operated by reversibly inserting and extracting lithium. According to the secondary battery, it is possible to achieve an excellent cycle life performance.

The cover layer may contain hydrated aluminum oxides other than boehmite. The cover layer is preferably formed of boehmite. The content of boehmite in the cover layer is, for example, 60% by mass or more. It is possible to determine whether the cover layer contains boehmite using micro-Raman spectroscopy analysis described below.

The boehmite according to the embodiment is an alumina monohydrate having an orthorhombic crystal structure with the composition formula AlOOH, and has high crystallinity such that the peak can be clearly observed by micro-Raman spectroscopy analysis. Specifically, a portion where the cover layer is formed on the surface of the negative electrode current collector is measured by micro-Raman spectroscopy analysis using a light source at a wavelength of 532 nm, and the resulting spectrum includes a main peak originated from the Al—O bond of boehmite within a range of from 350±20 $cm^{-1}$. It is preferable that the spectrum has another peak originated from the structure of boehmite in at least one of the ranges of 495±20 $cm^{-1}$, 675±20 $cm^{-1}$, and 1090±20 $cm^{-1}$. In this case, it is possible to further suppress the generation of hydrogen.

When the cover layer has a thickness of less than 10 nm, it is difficult to sufficiently prevent corrosion in a reduction atmosphere. Thus, the cover layer is broken and the aluminum is exposed, thereby generating hydrogen. As a result, the active material layer may be peeled from the negative electrode current collector. When the thickness of the cover layer is greater than 1000 nm, the cover layer is too thick, insertion/extraction of lithium through the cover layer hardly occurs, and thus this is not preferred. The thickness of the cover layer is preferably from 100 nm to 800 nm, and more preferably from 200 nm to 500 nm.

The thickness of the cover layer can be measured, for example, as follows.

First, the negative electrode is covered with the cover layer using an embedding resin. Then, a sample in which the cross section of the negative electrode can be observed using argon ion milling is produced. The sample is observed using a transmission electron microscope (TEM) at a magnification of 200,000 times. In addition, the elemental analysis is performed by Energy Dispersive X-ray (EDX) mapping using Energy Dispersive X-ray Spectrometer (EDS). The thickness of the cover layer can be clearly observed by the analysis. However, it is difficult to observe whether the cover layer contains the boehmite by only the analyses. Therefore, the structure of boehmite is identified by the results of the analyses and the result of the micro-Raman spectroscopy analysis. The thickness of the cover layer can be measured by the procedure as described above.

Further, the analysis using TEM observation in combination with EDX mapping allows for confirmation of a portion where the cover layer is formed on the surface of the negative electrode current collector and a portion where the cover layer is not formed thereon. The atomic concentration based on the content of aluminum and the atomic concentration based on the content of oxygen is different from each other, depending on the kinds of compounds such as aluminum metal, boehmite (AlOOH), and alumina ($Al_2O_3$). Different shades appear on the observation image due to a difference between the atomic concentrations. The observation of the shades allows for confirmation of a portion where the cover layer is formed and a portion where the cover layer is not formed.

It is preferable that the cover layer has a uniform in-plane thickness. For example, in the case where a cover layer of boehmite has a uniform in-plane thickness, the generation of hydrogen caused by exposure of an aluminum matrix can be suppressed, and thus charge/discharge can be reversibly performed. As a result, the current collector having the cover layer can be appropriately used for a secondary battery obtained by using an electrolyte containing an aqueous solvent. It is possible to observe that the in-plane thickness is uniform, for example, with a scanning electron microscope (SEM).

It is preferable that the cover layer is formed on the whole surface opposite to the negative electrode active material layer on the surface of the negative electrode current collector. When there is an exposed part of the current collector in the negative electrode, the electrolyte is brought into contact with the exposed part, thereby promoting the elution of metal from the current collector and the generation of hydrogen at an early stage. As a result, the active material layer may be promptly peeled from the current collector.

It is preferable that the cover layer has few pinholes which are opened in the thickness direction or has no pinholes. As described above, in the case where the cover layer is formed on the whole surface opposite to the negative electrode active material layer on the surface of the negative electrode current collector and has few pinholes, the coatability of the cover layer is sufficiently high. In the secondary battery obtained by using an electrolyte containing an aqueous solvent, it is preferable that the coatability of the cover layer is high in order to sufficiently suppress the generation of hydrogen from the current collector. The cover layer produced by the production method described below has a uniform in-plane thickness and high coatability.

It is preferable that the cover layer covers the whole surface of the negative electrode current collector. In other words, it is preferable that the cover layer has high coatability.

The cover layer according to the embodiment can be formed by, for example, an anode oxidation method or a boehmite-treatment method to be described below.

In the case of forming the cover layer by either of the above methods, the surface of the current collector is subjected to alkaline degreasing before the production of the layer. As a result of the degreasing, impurities and a naturally oxidized film on the surface of the current collector are removed. Thus, in the anode oxidation method or the boehmite-treatment method, the current collector is immersed in a solution, thereby suppressing the reattachment of impurities and surface reoxidation.

(Anode Oxidation Method)

The anode oxidation method is a method including: immersing a current collector in an electrolyte solution; and applying a direct current or a high voltage to the current collector as a positive electrode to form an oxidized film on the surface of the current collector.

The electrolyte solution is, for example, sulfuric acid, oxalic acid, phosphoric acid or chromic acid. It is preferable that the electrolyte solution is one in which dissolved oxygen is sufficiently removed by jetting nitrogen as bubbles in advance. The dissolved oxygen in the electrolyte solution is sufficiently removed, thereby suppressing the pinhole formation caused by oxidation.

It is preferable to perform an anode oxidation treatment in an inert atmosphere in order to prevent oxygen from being mixed with the electrolyte solution during the treatment. The inert atmosphere may be, for example, a nitrogen atmosphere.

When a film having a thickness of about 15 nm or more is formed by the anode oxidation method, the film is porous. Thus, when a current collector having the film in this state is used for an aqueous secondary battery, a water molecule enters into pores and hydrogen generates from the pores, thereby breaking the cover layer.

Therefore, it is preferable to perform a pore sealing treatment. The pore sealing treatment is performed by, for example, immersing the current collector having the above film in boiled pure water. As a result of the pore sealing treatment, boehmite is formed so as to seal the pores. The pore sealing treatment may be performed on a film having a thickness of less than 15 nm.

When a current collector with a small thickness is used in the anode oxidation method, the current collector may not endure an applied voltage or current, which may lead to breakage. When the anode oxidation method is performed using a current collector with a large thickness, a film to be formed is not broken and a cover layer with a sufficient thickness is formed on the surface. As the voltage to be applied is made smaller, the film to be formed tends to become thinner. As the voltage to be applied is made larger, the film to be formed tends to become thicker. In other words, the thickness varies depending on the voltage to be applied.

The anode oxidation method has difficulty in appropriately forming a cover layer in the case of using a current collector with a thickness of about 100 μm or less. As described above, in order to form a cover layer on a relatively thin current collector, the following boehmite-treatment method may be employed. In this regard, the boehmite-treatment method may be used to form a cover layer on the current collector with a thickness of 100 μm or more.

(Boehmite-Treatment Method)

The boehmite-treatment method is a method including: boiling pure water or an aqueous solution containing a small amount of alkali (e.g., triethanolamine) as an additive; and immersing a current collector therein to form a cover layer. When the boiled solution contains alkali, the solution functions as a growth agent. Accordingly, the formation of the boehmite layer on the surface of the current collector is promoted, thereby forming a thick cover layer with a sufficient film property.

As described above, the boehmite-treatment method may be used form a cover layer on a relatively thin current collector. It is preferable that the use of the relatively thin current collector increases the volume energy density of a battery.

In the boehmite-treatment method, when the time immersing the current collector in the boiled solution is shortened, the film to be formed tends to become thinner. When the time immersing the current collector in the boiled solution is lengthen, the film to be formed tends to become thicker.

In the case of using either the anode oxidation method or the boehmite-treatment method, after forming the cover layer, the drying process is preferably a natural drying process. For example, the drying process is preferably performed at a temperature of 80° C. or less for about 1 hour. When the drying process is performed at a relatively high temperature (e.g., 100° C.), dry spots form on the cover layer, thereby reducing the coatability.

As described above, the secondary battery according to the embodiment which includes a negative electrode, a positive electrode, and an electrolyte, and a separator may be interposed between the positive electrode and the negative electrode. Further, the secondary battery may further include a container that receives the negative electrode, the positive electrode, and the electrolyte.

Hereinafter, the negative electrode, the positive electrode, the electrolyte, the separator, and the container will be described.

1) Negative Electrode

The negative electrode includes a negative electrode current collector and a negative electrode active material layer which is formed on one side or both sides of the negative electrode current collector and contains an active material, a conductive agent, and a binder. The cover layer according to the embodiment is formed on at least one part of a surface of the negative electrode current collector. The cover layer may be formed on at least a part of a negative electrode tab, in addition to at least a part of a surface of the negative electrode current collector. The cover layer may be formed on the whole surface of the negative electrode tab.

The negative electrode current collector is preferably an aluminum foil or an aluminum alloy foil containing at least one kind of elements (one kind or two or more kinds) selected from Mg, Ti, Zn, Mn, Fe, Cu, and Si. The aluminum alloy foil may contain only one kind or two or more kinds of these elements. The negative electrode current collector may be in another form such as a porous body or mesh.

The thickness of the aluminum foil or the aluminum alloy foil is, for example, from 10 μm to 500 μm. When the above thickness is less than 10 µm, the possibility that the foil is cut during the production is increased. When the above thickness is greater than 500 µm, the volume energy density of a battery may be decreased. The thickness of the aluminum foil or the aluminum alloy foil is preferably 20 µm or less and more preferably 15 µm or less.

The purity of the aluminum foil is preferably 99% by mass or more, more preferably 99.3% by mass or more, and still more preferably 99.85% by mass or more.

The aluminum alloy is preferably an alloy containing an element such as magnesium, zinc or silicon. Meanwhile, the content of a transition metal such as iron, copper, nickel or chromium is preferably 1% by mass or less.

The negative electrode active material layer is formed on the negative electrode current collector, for example, at a density of 20 g/m$^2$ to 500 g/m$^2$. When the density is within the range, charge can be reversibly performed. It is difficult to produce an active material layer having a density of less than 20 g/m$^2$ by the coating process, which is thus not preferred. Further, an Li concentration gradient in an active material layer having a density of greater than 500 g/m$^2$ increases when lithium is inserted or extracted during the charge/discharge process, thereby reducing battery characteristics.

As the negative electrode active material, at least one (one kind or two or more kinds) of titanium-containing oxides such as titanium oxide, lithium titanium oxide, niobium titanium oxide, and sodium niobium titanium oxide may be used. The Li insertion potential of the titanium-containing oxide is preferably from 1.2 V (vs. Li/Li$^+$) to 2.0 V (vs. Li/Li$^+$). The negative electrode active material may contain one kind or two or more kinds of the titanium-containing oxides.

Examples of the titanium oxide include a titanium oxide having a monoclinic structure, a titanium oxide having a rutile structure, and a titanium oxide having an anatase structure. As for the titanium oxide having each of the crystal structures, the composition before charge is TiO$_2$ and the composition after charge is Li$_x$TiO$_2$ (0≤x≤1). Further, the structure of the titanium oxide having a monoclinic structure before charge is TiO$_2$ (B).

Examples of the lithium titanium oxide include a lithium titanium oxide having a spinel structure (e.g., Li$_{4+x}$Ti$_5$O$_{12}$ (−1≤x≤3); and a lithium titanium oxide having a ramsdellite structure (e.g., Li$_{2+x}$Ti$_3$O$_7$ (−1≤x≤3), Li$_{1+x}$Ti$_2$O$_4$ (0≤x≤1), Li$_{1.1+x}$Ti$_{1.8}$O$_4$ (0≤x≤1), Li$_{1.07+x}$Ti$_{1.86}$O$_4$ (0≤x≤1), and Li$_x$TiO$_2$ (0<x≤1). The lithium titanium oxide may be a lithium-titanium composite oxide into which a dopant is introduced.

Examples of the niobium titanium oxide include a niobium titanium oxide represented by Li$_a$TiM$_b$Nb$_{2±β}$O$_{7±σ}$ (0≤a≤5, 0≤b≤0.3, 0≤β≤0.3, 0≤σ≤0.3, where M is at least one kind of elements selected from the group consisting of Fe, V, Mo, and Ta).

Examples of the sodium niobium titanium oxide include an orthorhombic Na-containing niobium titanium composite oxide represented by Li$_{2+v}$Na$_{2-w}$M1$_x$Ti$_{6-y-z}$Nb$_y$M2$_z$O$_{14+δ}$ (0≤v≤4, 0<w<2, 0≤x<2, 0<y<6, 0≤z<3, −0.5≤δ≤0.5, M1 includes at least one selected from Cs, K, Sr, Ba, and Ca, and M2 includes at least one selected from Zr, Sn, V, Ta, Mo, W, Fe, Co, Mn, and Al.

It is preferable that the negative electrode active material is at least one selected from the group consisting of a spinel type lithium titanate (e.g., Li$_4$Ti$_5$O$_{12}$) and an anatase type titanium oxide (e.g., TiO$_2$). Each of the active materials has a low operating potential. However, in the case of using the negative electrode which includes the negative electrode current collector having the cover layer according to the embodiment, the peeling of the active material caused by the generation of hydrogen can be suppressed, whereby charge/discharge can be performed. As a result, it is possible to achieve a high energy density and an excellent cycle life performance.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

If necessary, the conductive agent is added in order to improve the current collection performance and suppress the contact resistance of the active material to the current collector. Examples of the conductive agent include carbonaceous substances such as acetylene black, ketjen black, graphite, and coke. The conductive agent may be used singly, or in mixture of two or more kinds thereof.

The binder functions to bond the active material and the conductive agent to be adhered to the current collector. As the binder, for example, at least one selected from the group consisting of polytetrafluoroethylene (PTFE), polyvinylidene fluoride (PVdF), a cellulose-based material (e.g., sodium carboxymethyl cellulose (CMC)), fluorine-based rubber, styrene butadiene rubber, an acrylic resin or its copolymer, polyacrylic acid, and polyacrylonitrile may be used, but is not limited thereto. The binder may be used singly, or in mixture of two or more kinds thereof.

As for the compounding ratio of the negative electrode active material, the conductive agent, and the binder in the negative electrode active material layer, it is preferable that the content of the negative electrode active material is from 60% by weight to 95% by weight, the content of the negative electrode conductive agent is from 2% by weight to 20% by weight, the content of the binder is from 2% by weight to 20% by weight. When the content of the conductive agent is less than 2% by weight, the current collection performance of the negative electrode active material layer is lowered and high current performance of the battery may be reduced. When the content of the binder is less than 2% by weight, the binding property of the negative electrode active material layer and the negative electrode current collector is lowered and cycle performance may be reduced. Meanwhile, from the viewpoint of performance of high capacity, the content of the conductive agent is preferably 10% by weight or less and the content of the binder is preferably 10% by weight or less.

The negative electrode is produced by, for example, the following method. First, a negative electrode active material, a conductive agent, and a binder are suspended in a solvent to prepare a slurry. Then, the slurry is applied to one side or both sides of a negative electrode current collector. Here, a cover layer is previously formed on the negative electrode current collector by the above method and the resulting collector is used. The coating film on the negative electrode current collector is dried to form a negative electrode active material layer. Thereafter, the negative electrode current collector and the negative electrode active material layer formed on the negative electrode current collector is pressed. A pellet containing the negative electrode active material, the conductive agent, and the binder may be used for the negative electrode active material layer.

2) Positive Electrode

The positive electrode includes a positive electrode current collector and a positive active material layer which is formed on one side or both sides of the positive electrode current collector and contains an active material, a conductive agent, and a binder.

The positive electrode current collector is formed of a metal such as stainless steel, Al or Ti. The positive electrode current collector may be in the form of porous body or mesh. In order to prevent corrosion of the current collector due to the reaction of the current collector with the electrolyte solution, the surface of the current collector may be coated with a dopant. Preferably, the positive electrode current collector is, for example, a Ti foil excellent in corrosion resistance and oxidation resistance. In the case of using a lithium salt ($Li_2SO_4$) used for the electrolyte described below, corrosion does not progress, and thus aluminum (Al) may be used as the positive electrode current collector.

A positive electrode active material allowing lithium to be inserted thereinto and extracted therefrom may be used. The positive electrode may contain one kind or two or more kinds of positive electrode active materials. Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a fluorinated lithium iron sulfate, and a phosphate compound having an olivine crystal structure (e.g., $Li_xFePO_4$ ($0 \leq x \leq 1$), $Li_xMnPO_4$ ($0 \leq x \leq 1$)). The phosphate compound having an olivine crystal structure is excellent in thermal stability.

Examples of the positive electrode active material by which a high positive electrode potential is obtained will be described below. Examples thereof include $Li_xMn_2O_4$ ($0<x \leq 1$) having a spinel structure, a lithium manganese composite oxide (e.g., $Li_xMnO_2$ ($0<x \leq 1$)), a lithium nickel aluminum composite oxide (e.g., $Li_xNi_{1-y}Al_yO_2$ ($0<x \leq 1$, $0<y \leq 1$)), a lithium cobalt composite oxide (e.g., $Li_xCoO_2$ ($0<x \leq 1$), a lithium nickel cobalt composite oxide (e.g., $Li_xNi_{1-y-z}Co_yMn_zO_2$ ($0<x \leq 1$, $0<y \leq 1$, $0 \leq z \leq 1$), a lithium manganese cobalt composite oxide (e.g., $Li_xMn_yCo_{1-y}O_2$ ($0<x \leq 1$, $0<y \leq 1$), a spinel type lithium manganese nickel composite oxide (e.g., $Li_xMn_{2-y}Ni_yO_4$ ($0<x \leq 1$, $0<y<2$)), a lithium phosphorus oxide having an olivine structure (e.g., $Li_xFePO_4$ ($0<x \leq 1$), $Li_xFe_{1-y}Mn_yPO_4$ ($0<x \leq 1$, $0 \leq y \leq 1$), $Li_xCoPO_4$ ($0<x \leq 1$)), and a fluorinated iron sulfate (e.g., $Li_xFeSO_4F$ ($0<x \leq 1$)).

The positive electrode active material is preferably at least one selected from the group consisting of a lithium cobalt composite oxide, a lithium manganese composite oxide, and a lithium phosphorus oxide having an olivine structure. The operating potential of each of the active materials is from 0.2 V (vs. $Li/Li^+$) to 0.8 V (vs. $Li/Li^+$), which is a high level. Further, the operating potential of each of the active materials exists near the equilibrium potential for oxygen evolution, thereby stably performing a charge/discharge cycle, which is preferred. These positive electrode active materials are used in combination with negative electrode active materials such as the spinel type lithium titanate and the anatase type titanium oxide so that a high battery voltage is obtained.

The positive electrode contains the positive electrode active material, for example, in the form of particles. The positive electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

If necessary, the conductive agent is added in order to improve the current collection performance and suppress the contact resistance of the active material to the current collector. Examples of the conductive agent include carbonaceous substances such as acetylene black, ketjen black, graphite, and coke. The conductive agent may be used singly, or in mixture of two or more kinds thereof.

Examples of the binder include polytetrafluoroethylene (PTFE), polyvinylidene fluoride (PVdF), fluorine-based rubber, ethylene-butadiene rubber, polypropylene (PP), polyethylene (PE), carboxymethylcellulose (CMC), polyimide (PI), and polyacrylimide (PAI). The binder may be used singly, or in mixture of two or more kinds thereof.

As for the compounding ratio of the positive electrode active material, the conductive agent, and the binder in the positive electrode active material layer, it is preferable that the content of the positive electrode active material is from 80% by weight to 95% by weight, the content of the positive electrode conductive agent is from 3% by weight to 18% by weight, the content of the binder is from 2% by weight to 7% by weight. When the compounding ratio of the conductive agent is 3% by weight or more, the electrical conductivity of the positive electrode can be made favorable. When the compounding ratio of the conductive agent is 18% by weight or less, the decomposition of the electrolyte on the surface of the conductive agent can be reduced. When the compounding ratio of the binder is 2% by weight or more, sufficient electrode strength can be attained. When the compounding ratio of the binder is 7% by weight or more, the insulating part of the electrode can be reduced.

The positive electrode is produced by, for example, the following method. First, a positive electrode active material, a conductive agent, and a binder are suspended in a solvent to prepare a slurry. Then, the slurry is applied to one side or both sides of a positive electrode current collector. The coating film on the positive electrode current collector is dried to form a positive electrode active material layer. Thereafter, the positive electrode current collector and the positive electrode active material layer formed on the positive electrode current collector is pressed. A pellet containing the positive electrode active material, the conductive agent, and the binder may be used for the positive electrode active material layer.

3) Electrolyte

The electrolyte contains a water-containing solvent and lithium ions. The electrolyte is, for example, a lithium-ion containing solution. The electrolyte may be a gel electrolyte obtained by complexing this solution and a polymer material. Examples of the polymer material include polyvinylidene fluoride (PVdF), polyacrylonitrile (PAN), and polyethylene oxide (PEO).

The lithium-ion containing solution is prepared by, for example, dissolving a lithium salt in a water-containing solvent. The water-containing solvent may be pure water, or may be a mixed solution and/or a mixed solvent of water and a substance other than water.

The lithium ions contained in the electrolyte are, for example, cations derived from lithium salt. Examples of the lithium salt include LiCl, LiBr, LiOH, $Li_2SO_4$, $LiNO_3$, LiTFSA (lithium trifluoromethane sulfonyl amide), and $LiB[(OCO)_2]_2$. The lithium salt to be used may be one kind or two or more kinds.

The lithium salt is preferably at least one selected from lithium chloride (LiCl), lithium sulfate ($Li_2SO_4$), and lithium nitrate (LiNO$_3$). The lithium salts are inexpensive because of the easiness of production, thereby producing a battery at low cost.

The concentration of lithium salt in the electrolyte is preferably 1 M or more. As the concentration of salt is increased, the equilibrium potential in insertion/extraction of lithium becomes a higher potential. Thus, it is possible to further suppress the generation of hydrogen. It is more preferable that the concentration of lithium salt in the electrolyte is from 3 M to a saturated concentration. The optimal concentration of salt may be appropriately changed by the combination with the positive electrode. In the case where the concentration of lithium salt is relatively high, the pH of the aqueous solution containing lithium ions may be appropriately changed. From the viewpoint of increasing the hydrogen overvoltage, the pH is preferably on an alkali side. The pH is on an alkali side, whereby the generation of hydrogen can be further suppressed. Examples of the method of adjusting the pH of an aqueous solution to the alkali side include a method of adding LiOH. However, when the pH is greater than 12, the corrosion of the current collector progresses, and thus this is not preferred. The pH of the aqueous solution is preferably within a range of from 2 to 11, and more preferably within a range of from 3 to 9. When the pH is within the above range, the corrosion of the cover layer can be suppressed, thereby achieving an excellent cycle life performance.

4) Separator

A separator may be disposed between the positive electrode and the negative electrode. Examples of the separator include non-woven fabrics, films, and paper. Examples of a constitution material of the separator include polyolefins such as polyethylene and polypropylene; and cellulose. Preferable examples of the separator include cellulose fiber-containing non-woven fabrics and polyolefin fiber-containing porous films.

The porosity of the separator is preferably 60% or more. The fiber diameter is preferably 10 μm or less. When the fiber diameter is set to 10 μm or less, the affinity of the electrolyte with the separator is improved, thereby reducing the battery resistance. The fiber diameter is more preferably 3 μm or less. A cellulose fiber-containing non-woven fabric having a porosity of 60% or more has an excellent electrolyte impregnation property. Such a separator is used so that a high output performance can be exerted in a range of from low to high temperatures. Further, the non-woven fabric does not react with the negative electrode during long-term charge storage, float charge or over-charge, thereby causing no short circuit between the negative electrode and the positive electrode due to the formation of lithium metal dendrites. The porosity of the separator is more preferably from 62% to 80%.

It is preferable that the separator has a thickness of from 20 μm to 100 μm and a density of from 0.2 g/cm$^3$ to 0.9 g/cm$^3$. When the thickness and the density of the separator are within the above ranges respectively, the balance between the mechanical strength and a reduction in resistance of the battery can be adjusted, making it possible to provide a secondary battery which has a high output and is resistant to the development of internal short circuits. Also, a reduction in thermal shrinkage of the separator at high temperatures and a favorable high-temperature storage performance can be attained.

5) Container

As the container that receives the positive electrode, negative electrode, and electrolyte, a metal container, a laminate film container or a resin container which is made of polyethylene or polypropylene may be used.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes. Further, the secondary battery may have a bipolar structure. As a result, a plural of cells connected in series can be produced by one cell, which is advantageous.

Hereinafter, an example of the secondary battery according to the embodiment will be described with reference to FIGS. 1 to 3.

FIG. 1 is a cross-sectional view schematically showing an example of a rectangular secondary battery according to the embodiment. FIG. 2 is a cross-sectional view along the II-II line of the rectangular secondary battery shown in FIG. 1.

An electrode group 13 is received in a rectangular cylindrical metal container 20. The electrode group 13 has a structure in which multiple positive electrodes 10, multiple negative electrodes 11, and multiple separators 12 are stacked in the order of the positive electrode 10, the separator 12, the negative electrode 11, and the separator 12. Alternatively, the electrode group 13 may have a spirally wound flat structure in which the separator 12 is provided between the positive electrode 10 and the negative electrode 11. In the case where the electrode group 13 has either of the structures, it is preferable that the separator 12 is disposed on the outermost layer of the electrode group 13 in order to avoid the contact between the electrode and the metal container 20. An electrolyte (not shown) is supported by the electrode group 13.

Figure 2:
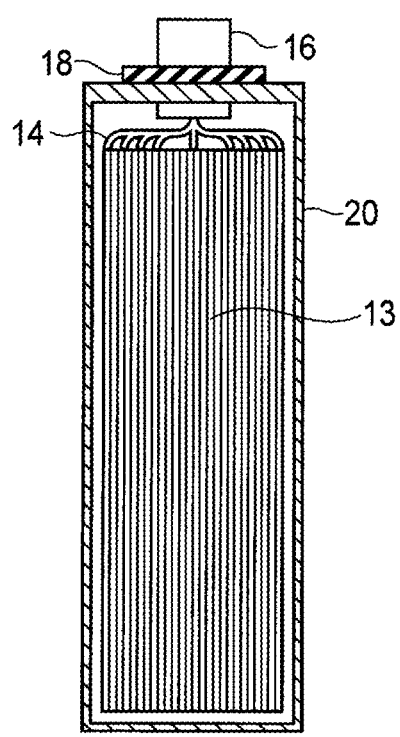
FIG. 2 is a cross-sectional view along the II-II line of the rectangular secondary battery shown in FIG. 1.

As shown in FIG. 2, band-shaped positive electrode tabs 14 are electrically connected to a plural of points of the positive electrode 10 located at the end surface of the electrode group 13. Although not illustrated, band-shaped negative electrode tabs 15 are electrically connected to a plural of points of the negative electrode 11 located at the end surface. The positive electrode tabs 14 are electrically connected to a positive electrode lead 16 in a bundled state. A positive electrode terminal is constituted of the positive electrode tab 14 (positive electrode inner terminal) and the positive electrode lead 16 (positive electrode external terminal). The negative electrode tabs 15 are electrically connected to a negative electrode lead 17 in a bundled state. A negative electrode terminal is constituted of the negative electrode tab 15 (negative electrode inner terminal) and the negative electrode lead 17 (negative electrode external terminal).

A metal sealing plate 21 is secured to an opening part of the metal container 20 by welding. The positive electrode lead 16 and the negative electrode lead 17 are respectively drawn externally from each drawing hole formed in the sealing plate 21. A positive electrode gasket 18 and a negative electrode gasket 19 are respectively disposed on the inner periphery surface of each drawing hole of the sealing plate 21 in order to avoid short circuits developed by the contact between the positive electrode lead 16 and sealing plate 21, and by the contact between the negative electrode lead 17 and sealing plate 21. The airtightness of the rectangular secondary battery can be ensured by disposing the positive electrode gasket 18 and the negative electrode gasket 19.

A control valve 22 (safety valve) is disposed in the sealing plate 21. In the case where the internal pressure of a battery cell is increased due to gas generated by electrolysis of an aqueous solvent, it is possible to diffuse the generated gas from the control valve 22 to the outside. The control valve 22 to be used is, for example, a return control valve which operates when the internal pressure becomes higher than a set value and which functions as a sealing plug when the internal pressure decreases. Alternatively, a non-return valve may be used, where once it is operated, its function as the sealing plug is not recovered. In FIG. 2, the control valve 22 is disposed in the center of the sealing plate 21, and the control valve 22 may be located at the end of the sealing plate 21. The control valve 22 may be omitted.

An injection port 23 is formed in the sealing plate 21. An electrolyte is poured through the injection port 23. The injection port 23 is closed by a sealing plug 24 after pouring the electrolyte. The injection port 23 and the sealing plug 24 may be omitted.

A battery module may be formed of the secondary batteries according to the embodiment.

Examples of the battery module include those including a plural of unit cells electrically connected in series, in parallel, or in a combination of in series and in parallel; a unit constituted of a plural of unit cells electrically connected in series; those including a unit constituted of a plural of unit cells electrically connected in parallel; and a unit constituted of a plural of unit cells electrically connected in a combination of in series and in parallel.

The battery module may be received in a cabinet. As the cabinet, a metal can which is made of an aluminum alloy, iron or stainless steel or a plastic container may be used. The thickness of the container is preferably 0.5 mm or more.

Examples of the form of serial or parallel electrical connection of a plural of secondary batteries include serial or parallel electrical connection of a plural of secondary batteries each having a container, and serial or parallel electrical connection of a plural of secondary electrode groups received in a common cabinet. According to a specific example of the former, a plural of secondary batteries whose positive and negative electrode terminals are connected by a metal bus bar (e.g., aluminum, nickel, copper). According to a specific example of the latter, a plural of electrode groups are received in one cabinet with electrochemically insulated by a diaphragm, and these electrode groups are electrically connected in series. Five to seven batteries are electrically connected in series so that a battery module having favorable voltage compatibility with the lead storage battery can be realized. In order to increase the voltage compatibility with the lead storage battery, it is preferable that five or six unit cells are configured to be connected in series.

An example of the battery module will be described with reference to FIG. 3.

Figure 3:
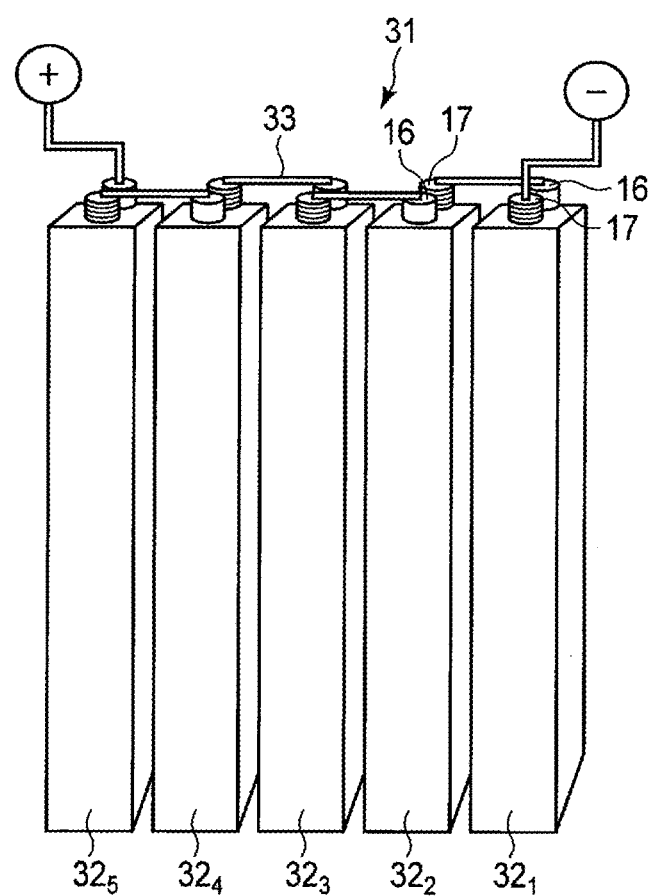
FIG. 3 is a perspective view schematically showing an example of a battery module according to the first embodiment.

FIG. 3 is a perspective view schematically showing an example of a battery module which includes a plural of the rectangular secondary batteries according to the embodiment as a unit cell. A battery module 31 includes the rectangular secondary batteries (e.g., batteries $32_1$ to $32_5$ described in FIGS. 1 and 2). The positive electrode lead 16 of the battery $32_1$ is electrically connected to the negative electrode lead 17 of the battery $32_2$ located adjacent to the battery $32_1$ through a lead 33. Further, the positive electrode lead 16 of the battery $32_2$ is electrically connected to the negative electrode lead 17 of the battery $32_3$ located adjacent to the battery $32_2$ through the lead 33. Thus, the batteries $32_1$ to $32_5$ are connected in series.

Five of the secondary batteries according to the embodiment are connected in series so that excellent compatibility with a lead storage battery can be realized. Therefore, a battery module formed by connecting five secondary batteries in series may be used as an alternative power source of the lead storage battery.

According to the secondary battery according to the first embodiment, the negative electrode includes an aluminum-containing negative electrode current collector and a boehmite-containing cover layer, and the boehmite-containing cover layer is provided on at least a part of a surface of the negative electrode current collector, and has a thickness of 10 nm to 1000 nm. Thus, it is possible to suppress the generation of hydrogen from the negative electrode current collector. Accordingly, it is possible to reduce the peeling of the active material layer from the negative electrode current collector and achieve an excellent cycle life performance.

Second Embodiment

According to a second embodiment, a battery pack is provided. The battery pack includes the secondary battery according to the first embodiment.

The battery pack may include one or a plural of the secondary batteries (unit cells) according to the first embodiment as described above. The secondary batteries included in the battery pack may be electrically connected in series, in parallel, or in a combination of in series and in parallel.

The battery pack may further include a protective circuit. The protective circuit controls charge/discharge of the secondary battery. Alternatively, a circuit included in a device using as the battery pack as a power source (e.g., an electronic device or an automobile) may be used as the protective circuit of the battery pack.

Further, the battery pack may further include an external power distribution terminal. The external power distribution terminal outputs a current from the secondary battery to outside and inputs a current to the secondary battery. In other words, when the battery pack is used as a power source, the current is supplied to the outside through the external power distribution terminal. When charging the battery pack, charging current (including a regenerative energy caused by, for example, power of automobile) is supplied to the battery pack through the external power distribution terminal.

Figure 4:
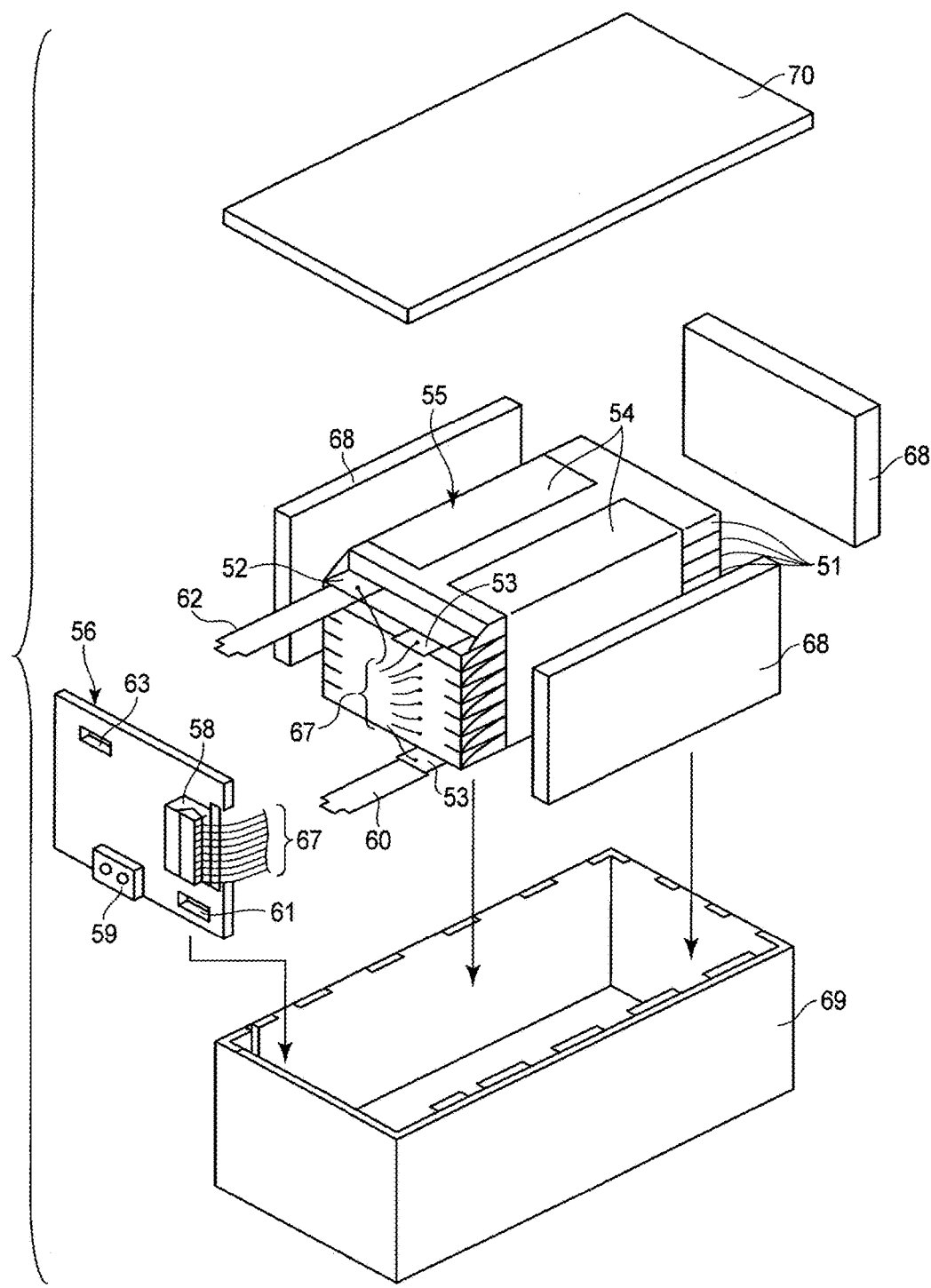
FIG. 4 is an exploded perspective view schematically showing an example of a battery pack according to a second embodiment.

An example of the battery pack according to the embodiment will be described in detail with reference to FIGS. 4 and 5. FIG. 4 is an exploded perspective view of a battery pack. FIG. 5 is a block diagram showing an electric circuit of the battery pack of FIG. 4.

A plurality of unit cells 51 constituted of flat-shaped lithium secondary batteries is stacked in such a manner that a negative electrode terminal 52 and a positive electrode terminal 53 extending out are oriented in the same direction, and bound by an adhesive tape 54 to form a battery module 55. As shown in FIG. 5, the unit cells 51 are electrically connected in series with each other.

A printed wiring board 56 is disposed opposing to the side surface of the unit cells 51 from which the negative electrode terminal 52 and the positive electrode terminal 53 are extended. As shown in FIG. 5, a thermistor 57, a protective circuit 58, and an external power distribution terminal 59 are mounted on the printed wiring board 56. Incidentally, an insulating plate (not shown) is attached to the surface of the printed wiring board 56 which faces the battery module 55, thereby avoiding unnecessary connection of the wiring line of the battery module 55 with the printed wiring board 56.

A positive electrode lead 60 is connected to the positive electrode terminal 53 which is located at the undermost layer of the battery module 55, and its tip is inserted to and electrically connected to a positive electrode connector 61 of the printed wiring board 56. A negative electrode lead 62 is connected to the negative electrode terminal 52 which is located at the uppermost layer of the battery module 55, and its tip is inserted to and electrically connected to a negative electrode connector 63 of the printed wiring board 56. These connectors 61 and 63 are connected to the protective circuit 58 via wiring lines 64 and 65 that are formed on the printed wiring board 56.

The thermistor 57 detects the temperature of each of the unit cells 51 and sends the detection signal to the protective circuit 58. The protective circuit 58 can shut down a plus wiring line 66a and a minus wiring line 66b between the protective circuit 58 and the external power distribution terminal 59 under a predetermined condition. The predetermined condition refers to, for example, the time at which the temperature detected by the thermistor 57 reaches a predetermined temperature or more. Further, the predetermined condition, refers to the time at which over-charge, over-discharge, and over-current of the unit cells 51 are detected. The over-charge detection is performed on each of the unit cells 51 or the battery module 55. In the case where each of the unit cells 51 is detected, the battery voltage may be detected or the positive electrode potential or the negative electrode potential may be detected. In the case of the latter, a lithium electrode to be used as a reference electrode is inserted into each of the unit cells 51. In the case of FIGS. 4 and 5, wiring lines 67 for voltage detection are connected to the unit cells 51 and detection signals are sent to the protective circuit 58 through the wiring lines 67.

Protective sheets 68 made of rubber or resin are formed on three side surfaces of the battery module 55 except for the side face from which the positive electrode terminal 53 and the negative electrode terminal 52 protrude.

The battery module 55 is received in a receiving container 69 together with each of the protective sheet 68 and the printed wiring board 56. In other words, the protective sheets 68 are disposed on both inner surfaces in a long side direction and one of the inner surfaces in a short side direction of the receiving container 69, and the printed wiring board 56 is disposed on the other inner surface in a short side direction. The battery module 55 is located in a space surrounded by the protective sheets 68 and the printed wiring board 56. A lid 70 is attached to the top of the receiving container 69.

In order to fix the battery module 55, a heat-shrinkable tape may be used in place of the adhesive tape 54. In this case, the battery module 55 is bound by placing the protective sheets on both side surfaces of the battery module 55, winding the heat-shrinkable tape and two protective sheets around the battery module 55, and thermally shrinking the heat-shrinkable tape.

FIGS. 4 and 5 show a form in which the unit cells 51 are connected in series. As described above, the unit cells may be connected in parallel in order to increase the battery capacity. Alternatively, the unit cells may be connected in a combination of in series and in parallel. The assembled battery pack may be connected in series or in parallel.

The form of the battery pack is appropriately changed according to the use. Preferably, the battery pack is used for an application for which charge/discharge at high current is required. Specifically, the battery pack is used as a power source for digital cameras, for vehicles such as two- or four-wheeled hybrid electric vehicle, for two- or four-wheeled electric vehicles, for assisted bicycles, for stationary battery, and for rail way car. Particularly preferably, the battery pack is mounted to a vehicle.

In a vehicle having the battery pack according to the second embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

As described above, the battery pack according to the second embodiment includes the secondary battery of the first embodiment so that it is possible to suppress the peeling of the active material layer from the negative electrode current collector and achieve an excellent cycle life performance. According to the second embodiment, it is possible to provide a battery pack suitable as an alternative power source of a lead battery used as a starter power source for vehicle, or a vehicle-mounted secondary battery which is mounted in a hybrid car.

Third Embodiment

According to a third embodiment, a vehicle is provided. The vehicle includes the battery pack according to the second embodiment.

FIG. 6 shows an example of a vehicle which includes the battery pack according to the second embodiment.

An automobile 41 shown in FIG. 6 has a battery pack 42 mounted in an engine room in front of a vehicle body. The location where the battery pack is mounted in the automobile is not limited to the engine room. For example, the battery pack may be mounted at the rear side of the vehicle body of the automobile or under the seat.

EXAMPLES

Hereinafter, Examples will be described, however, the embodiments are not limited to the following examples.

Example 1

An aluminum plate having a thickness of 200 μm and a purity of 99.3% was provided. The plate was immersed in 5% by weight of an aqueous sodium hydroxide, and subjected to degreasing. Then, the aluminum plate was cleaned and immersed in a sulfuric acid solution in a nitrogen atmosphere, and a voltage was applied from the positive electrode to form an oxide layer on the surface. The sulfuric acid solution was used after dissolved oxygen was sufficiently removed by jetting nitrogen as bubbles in advance. After that, the pore sealing treatment was performed by putting the aluminum plate in boiled pure water after cleaning the plate again, and thus a current collector having a boehmite-containing cover layer was produced on the surface.

(Micro-Raman Spectroscopy Analysis)

A portion with the cover layer formed on the surface of the obtained current collector was measured by micro- Raman spectroscopy using a light source with a wavelength of 532 nm. FIG. 7 shows the resulting Raman spectrum. The Raman spectrum indicates that peaks were observed at positions of 353 cm$^{-1}$, 493 cm$^{-1}$, and 675 cm$^{-1}$. These peak positions correspond to peak intensity positions of the Raman spectrum of boehmite described in FIG. 1 of Journal of Raman Spectroscopy, vol. 32, page 745(2011). Consequently, it is determined that the boehmite-containing cover layer present on the surface has a sufficient concentration.

(SEM Observation)

Figure 8:
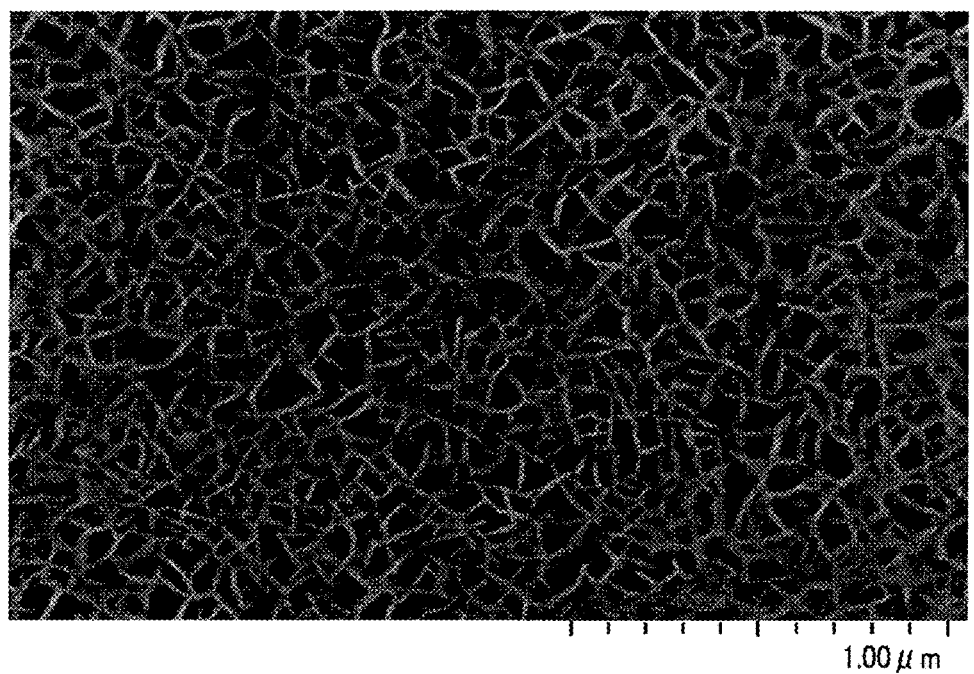
FIG. 8 is a photograph showing an SEM observation image according to the surface of the current collector of Example 1.

The surface of the current collector having the cover layer was observed using SEM at a magnification of 500,000 times. FIG. 8 shows the resulting SEM observation image. From FIG. 8, it is confirmed that the surface of the cover layer has a network structure and the cover layer uniformly covers the surface of the current collector. Further, it is confirmed that the surface of the cover layer has spots.

(TEM Observation and EDX Mapping)

Figure 9:
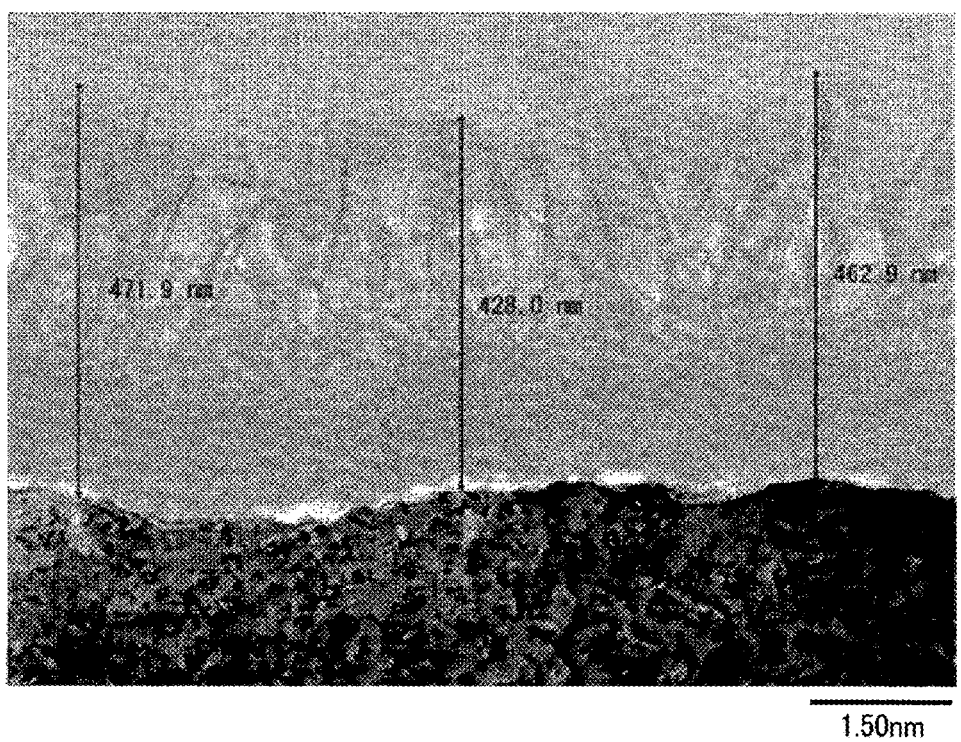
FIG. 9 is a photograph showing a TEM observation image according to a cross-section of the current collector of Example 1.

Subsequently, the cross section of the current collector was observed by TEM according to the method described in the first embodiment. The magnification was set to 200,000 times. FIG. 9 shows the resulting TEM observation image. As shown in FIG. 9, the cover layer having a contrast lower than that of the aluminum matrix was observed. Further, the elemental analysis was performed by EDX mapping. Furthermore, the results of the analyses reveal that the cover layer having a thickness of about 450 nm is present on the surface of the current collector.

(Cyclic Voltammetry Analysis)

Subsequently, a three-electrode cell was measured by cyclic voltammetry and then was evaluated.

A current collector having a cover layer (electrode area: 0.5 cm$^2$) was used as the working electrode, a Pt metal wire was used as the counter electrode, a saturated calomel electrode was used as the reference electrode, and an aqueous solution obtained by dissolving lithium chloride (salt) at a concentration of 3.5 M was used as the electrolyte solution. The potential range was in a range of from −1 V to −1.8 V (vs. SCE) and the sweep rate was 10 mV/sec. FIG. 10 is a graph showing the measurement results of 10 cycles. FIG. 10 also shows the results of cyclic voltammetry of Example 9 and Comparative example 1 as described below. The "current" in the graph represents a value of a reduction current caused by the generation of hydrogen. Based on the results of FIG. 10, an absolute value of the reduction current of the current collector according to Example 1 was 0.002 mA/cm$^2$ (Constant Current Charge/Discharge Evaluation)

Further, an electrode having the above current collector was produced in the following manner. Lithium titanate (Li$_4$Ti$_5$O$_{12}$) was used as an active material, graphite was used as a conductive auxiliary agent, and PTFE was used as a binder. The composition in the active material layer had a weight ratio of (the active material:the conductive auxiliary agent:and the binder) 100:20:10. Each powder was added to an N-methyl-2-pyrrolidone solution, which was mixed and stirred to prepare a slurry. The slurry was applied to both sides of the current collector having the cover layer. Then, the solvent was dried and the current collector was rolled to produce an electrode having a density of 20 g/m$^2$.

This electrode was used as the working electrode (electrode area: 0.5 cm$^2$), a Ti metal wire was used as the counter electrode, and an aqueous solution obtained by dissolving lithium chloride (salt) at a concentration of 3.5 M and lithium sulfate (salt) at a concentration of 0.5 M was used as the electrolyte solution, resulting in formation of a single electrode evaluation cell. The potential range was in a range of from −0.5 V to −1.8 V (vs. SCE). Charge/discharge was performed at a constant current under the conditions (termination time: 10 minutes, current density: 30 A/m$^2$). The result is shown in FIG. 11.

In the first cycle, a plateau due to the insertion/extraction of lithium (Li$_4$Ti$_5$O$_{12}$) was observed near −1.6 V (vs. SCE), which confirmed that charge/discharge was reversibly performed. However, the charge/discharge efficiency was low in the first cycle because the current resulting from the generation of hydrogen associated with insertion of lithium was flowed during the charge process. However, the current caused by the generation of hydrogen was reduced as the cycle repeated. Thus, the efficiency was improved, thereby achieving a discharge capacity value of 170 mAh/g as an assumed value when Li$_4$Ti$_5$O$_{12}$ was used. In the 50th cycle, the charge/discharge efficiency became maximum. At this time, the charge/discharge efficiency (the maximum charge/discharge efficiency) was 82%.

The charge/discharge measurement was continued and thus the charge/discharge capacity was gradually decreased. This is assumed to be due to the fact that the cover layer was broken due to an increase in cycle number, thereby peeling of the negative electrode active material layer. When the cycle number reached 300 cycles, the capacity was 80% relative to the maximum discharge capacity. The cycle number in this case was defined as cycle life.

The above results are shown in Tables 1 and 2 below. Tables 1 and 2 show the results of Examples 2 to 25 and Comparative examples 1 to 6 described below. In Table 2, the "absolute value of the current" represents an absolute value of the current caused by the generation of hydrogen on the surface of the current collector.

Examples 2 to 8 and Comparative Examples 3 to 4

Current collectors having the cover layer were produced in the same manner as in Example 1 except that the thickness of the aluminum plate and the voltage applied during the anode oxidation treatment were adjusted and the thickness of the cover layer formed on the surface of the aluminum plate was changed.

Various evaluations were performed in the same manner as in Example 1 using each of the current collectors produced in the examples. These results are shown in Tables 1 and 2. In the constant current charge/discharge evaluation in Comparative examples 3 and 4, charge/discharge could not be performed due to an increase in resistance and peeling of the active material layer.

Example 9

An aluminum foil having a thickness of 15 μm and a purity of 99.85% was provided. The foil was immersed in 5% by weight of an aqueous sodium hydroxide, and subjected to degreasing. Then, the aluminum plate foil was cleaned and immersed in a boiled aqueous solution containing 0.3% by weight of triethanolamine in a nitrogen atmosphere as boehmite treatment. This aqueous solution was used after sufficiently removing dissolved oxygen by jetting nitrogen as bubbles in advance. Thus, a current collector with a boehmite-containing cover layer on its surface was produced.

Micro-Raman spectroscopy analysis, SEM observation, TEM observation, EDX mapping, cyclic voltammetry analysis, and constant current charge/discharge evaluation were performed in the same manner as in Example 1 using the obtained current collector. The obtained TEM image indicates that the cover layer having a thickness of about 100 nm is present.

FIG. 12 is a photograph showing the SEM observation image according to the surface of the current collector produced in Example 9. The SEM image shows that the surface has a structure in which fine needle-shaped particles are lined. It is confirmed that the cover layer having such a structure is uniformly formed on the surface of the current collector.

FIG. 13 is a Raman spectrum according to the surface of the current collector of Example 9. The Raman spectrum shows that a peak was observed at least a position of 353 cm$^{-1}$. Therefore, it is found that the cover layer contains Al and O elements and has a peak originated from the Al—O bond.

Examples 10 to 14 and Comparative Examples 5 to 6

Current collectors having the cover layer were produced in the same manner as in Example 1 except that the time immersing the aluminum plate in the boiling solution was adjusted and the thickness of the cover layer formed on the surface of the aluminum plate was changed.

Various evaluations were performed in the same manner as in Example 1 using each of the current collectors produced in the examples. These results are shown in Tables 1 and 2. In the constant current charge/discharge evaluation in Comparative examples 5 and 6, charge/discharge could not be performed due to an increase in resistance and peeling of the active material layer.

Examples 15 to 23

Current collectors having the cover layer were produced in the same manner as in Example 1 except that the kind of supporting electrolyte and the concentration of salt were changed as shown in Table 1.

Various evaluations were performed in the same manner as in Example 1 using each of the current collectors produced in the examples. These results are shown in Tables 1 and 2.

Example 24

A current collector having the cover layer was produced in the same manner as in Example 1 except that the anatase type $TiO_2$ was used as the negative electrode active material. Various evaluations were performed in the same manner as in Example 1 using each of the current collectors produced in the examples. These results are shown in Tables 1 and 2.

Example 25

A current collector having the cover layer was produced in the same manner as in Example 1 except that the anatase type $TiO_2$ was used as the negative electrode active material and an aqueous solution containing lithium chloride at a concentration of 9 M was used as the electrolyte solution. Various evaluations were performed in the same manner as in Example 1 using each of the current collectors produced in the examples. These results are shown in Tables 1 and 2.

Comparative Example 1

Various evaluations were performed in the same manner as in Example 1 using an aluminum plate having no cover layer as the current collector. These results are shown in Tables 1 and 2. In the constant current charge/discharge evaluation in Comparative example 1, charge/discharge could not be performed due to peeling of the active material layer.

Comparative Example 2

Various evaluations were performed in the same manner as in Example 1 except that an aluminum plate having no cover layer was used as the current collector, and the anatase type $TiO_2$ was used as the negative electrode active material when producing an electrode. These results are shown in Tables 1 and 2. In the constant current charge/discharge evaluation in Comparative example 2, charge/discharge could not be performed due to peeling of the active material layer.

TABLE 1

|  | Treatment method | Thickness of the cover layer (nm) | Negative electrode active material | Electrolyte solution |
| --- | --- | --- | --- | --- |
| Example 1 | Anode oxidation method | 450 | $Li_4Ti_5O_{12}$ | LiCl 3.5M + $Li_2SO_4$ 0.5M/$H_2O$ |
| Example 2 | Anode oxidation method | 1000 | $Li_4Ti_5O_{12}$ | LiCl 3.5M + $Li_2SO_4$ 0.5M/$H_2O$ |
| Example 3 | Anode oxidation method | 800 | $Li_4Ti_5O_{12}$ | LiCl 3.5M + $Li_2SO_4$ 0.5M/$H_2O$ |
| Example 4 | Anode oxidation method | 600 | $Li_4Ti_5O_{12}$ | LiCl 3.5M + $Li_2SO_4$ 0.5M/$H_2O$ |
| Example 5 | Anode oxidation method | 200 | $Li_4Ti_5O_{12}$ | LiCl 3.5M + $Li_2SO_4$ 0.5M/$H_2O$ |
| Example 6 | Anode oxidation method | 100 | $Li_4Ti_5O_{12}$ | LiCl 3.5M + $Li_2SO_4$ 0.5M/$H_2O$ |
| Example 7 | Anode oxidation method | 50 | $Li_4Ti_5O_{12}$ | LiCl 3.5M + $Li_2SO_4$ 0.5M/$H_2O$ |
| Example 8 | Anode oxidation method | 10 | $Li_4Ti_5O_{12}$ | LiCl 3.5M + $Li_2SO_4$ 0.5M/$H_2O$ |
| Example 9 | Boehmite-treatment method | 100 | $Li_4Ti_5O_{12}$ | LiCl 3.5M + $Li_2SO_4$ 0.5M/$H_2O$ |
| Example 10 | Boehmite-treatment method | 50 | $Li_4Ti_5O_{12}$ | LiCl 3.5M + $Li_2SO_4$ 0.5M/$H_2O$ |
| Example 11 | Boehmite-treatment method | 10 | $Li_4Ti_5O_{12}$ | LiCl 3.5M + $Li_2SO_4$ 0.5M/$H_2O$ |
| Example 12 | Boehmite-treatment method | 600 | $Li_4Ti_5O_{12}$ | LiCl 3.5M + $Li_2SO_4$ 0.5M/$H_2O$ |
| Example 13 | Boehmite-treatment method | 800 | $Li_4Ti_5O_{12}$ | LiCl 3.5M + $Li_2SO_4$ 0.5M/$H_2O$ |
| Example 14 | Boehmite-treatment method | 1000 | $Li_4Ti_5O_{12}$ | LiCl 3.5M + $Li_2SO_4$ 0.5M/$H_2O$ |
| Example 15 | Anode oxidation method | 450 | $Li_4Ti_5O_{12}$ | LiCl 1M/$H_2O$ |
| Example 16 | Anode oxidation method | 450 | $Li_4Ti_5O_{12}$ | LiCl 3M/$H_2O$ |
| Example 17 | Anode oxidation method | 450 | $Li_4Ti_5O_{12}$ | LiCl 6M/$H_2O$ |
| Example 18 | Anode oxidation method | 450 | $Li_4Ti_5O_{12}$ | LiCl 9M/$H_2O$ |
| Example 19 | Anode oxidation method | 450 | $Li_4Ti_5O_{12}$ | LiCl 12M/$H_2O$ |
| Example 20 | Anode oxidation method | 450 | $Li_4Ti_5O_{12}$ | $Li_2SO_4$ 1M/$H_2O$ |
| Example 21 | Anode oxidation method | 450 | $Li_4Ti_5O_{12}$ | $Li_2SO_4$ 2M/$H_2O$ |
| Example 22 | Anode oxidation method | 450 | $Li_4Ti_5O_{12}$ | $LiNO_3$ 6M/$H_2O$ |
| Example 23 | Anode oxidation method | 450 | $Li_4Ti_5O_{12}$ | $LiNO_3$ 8M/$H_2O$ |

TABLE 1-continued

| | Treatment method | Thickness of the cover layer (nm) | Negative electrode active material | Electrolyte solution |
|---|---|---|---|---|
| Example 24 | Anode oxidation method | 450 | $TiO_2$ | LiCl 3.5M + $Li_2SO_4$ 0.5M/$H_2O$ |
| Example 25 | Anode oxidation method | 450 | $TiO_2$ | LiCl 9M/$H_2O$ |
| Comparative example 1 | No treatment | 1 | $Li_4Ti_5O_{12}$ | LiCl 3.5M + $Li_2SO_4$ 0.5M/$H_2O$ |
| Comparative example 2 | No treatment | 1 | $TiO_2$ | LiCl 3.5M + $Li_2SO_4$ 0.5M/$H_2O$ |
| Comparative example 3 | Anode oxidation method | 1100 | $Li_4Ti_5O_{12}$ | LiCl 3.5M + $Li_2SO_4$ 0.5M/$H_2O$ |
| Comparative example 4 | Anode oxidation method | 5 | $Li_4Ti_5O_{12}$ | LiCl 3.5M + $Li_2SO_4$ 0.5M/$H_2O$ |
| Comparative example 5 | Boehmite-treatment method | 1100 | $Li_4Ti_5O_{12}$ | LiCl 3.5M + $Li_2SO_4$ 0.5M/$H_2O$ |
| Comparative example 6 | Boehmite-treatment method | 5 | $Li_4Ti_5O_{12}$ | LiCl 3.5M + $Li_2SO_4$ 0.5M/$H_2O$ |

TABLE 2

| | Absolute value of current (mA/cm$^2$) | Negative electrode discharge capacity (mAh/g) | Maximum charge/discharge efficiency(%) | Cycle life (cyc) |
|---|---|---|---|---|
| Example 1 | 0.002 | 160 | 82 | 300 |
| Example 2 | 0.002 | 160 | 85 | 500 |
| Example 3 | 0.002 | 160 | 85 | 400 |
| Example 4 | 0.002 | 160 | 85 | 300 |
| Example 5 | 0.002 | 160 | 85 | 260 |
| Example 6 | 0.26 | 160 | 85 | 200 |
| Example 7 | 0.8 | 140 | 70 | 60 |
| Example 8 | 1.8 | 120 | 62 | 30 |
| Example 9 | 0.36 | 160 | 85 | 140 |
| Example 10 | 0.8 | 140 | 70 | 20 |
| Example 11 | 1.8 | 100 | 45 | 10 |
| Example 12 | 0.01 | 160 | 85 | 200 |
| Example 13 | 0.02 | 160 | 85 | 300 |
| Example 14 | 0.002 | 160 | 85 | 400 |
| Example 15 | 0.002 | 60 | 42 | 30 |
| Example 16 | 0.002 | 80 | 75 | 160 |
| Example 17 | 0.002 | 100 | 85 | 300 |
| Example 18 | 0.002 | 140 | 98 | 600 |
| Example 19 | 0.002 | 140 | 98 | 400 |
| Example 20 | 0.002 | 40 | 30 | 30 |
| Example 21 | 0.002 | 60 | 42 | 100 |
| Example 22 | 0.002 | 50 | 38 | 40 |
| Example 23 | 0.002 | 80 | 60 | 140 |
| Example 24 | 0.002 | 140 | 92 | 500 |
| Example 25 | 0.002 | 130 | 98 | 800 |
| Comparative example 1 | 42 | — | — | 0 |
| Comparative example 2 | 42 | — | — | 0 |
| Comparative example 3 | 0 | — | — | 0 |
| Comparative example 4 | 5 | — | — | 0 |
| Comparative example 5 | 0 | — | — | 0 |
| Comparative example 6 | 10 | — | — | 0 |

The results of Tables 1 and 2 show the following.

Examples 2 to 8 and Comparative examples 3 to 4 are examples in which the cover layer was formed by the anode oxidation method. From these results, it is confirmed that when the thickness of the cover layer is increased, whereby the peeling is suppressed during the charge/discharge process and the cycle life is improved. However, like Comparative example 3, when the thickness of the cover layer was greater than 1000 nm, the thickness of the cover layer was too large. Thus, the electrical connection was prevented, whereby charge/discharge could not be performed. Meanwhile, like Comparative example 4, when the thickness of the cover layer was less than 10 nm, the generation of hydrogen on the surface of the current collector was suppressed. However, when an electrode was produced, charge/discharge could not be performed. When the thickness of the cover layer was from 100 nm to 1000 nm, the generation of hydrogen was sufficiently suppressed and both the maximum charge/discharge efficiency and the cycle life were excellent.

Examples 10 to 14 and Comparative examples 5 to 6 are examples in which the cover layer was formed by the boehmite-treatment method. These results show that the current collector having the cover layer according to the embodiment can be formed by not only the anode oxidation method but also the boehmite-treatment method. In the boehmite-treatment method, when the thickness of the cover layer was from 100 nm to 1000 nm, the generation of hydrogen was sufficiently suppressed and both the maximum charge/discharge efficiency and the cycle life were excellent. However, the cycle life tended to be inferior to that of the electrode produced by the anode oxidation method. This is assumed to be due to the fact that the adherence between the cover layer formed by the boehmite-treatment method and the current collector is poor compared to the adherence between the cover layer formed by the anode oxidation method and the current collector. However, as described in the first embodiment, the boehmite-treatment method is useful since it is applicable to a relatively thin aluminum foil.

As seen from Examples 15 to 23, even when the kind and concentration of the supporting salt are changed, it is possible to reversibly perform charge/discharge of the negative electrode. It is found that even when lithium nitrate, lithium sulfate or lithium chloride is used singly as the supporting salt, it is possible to form a battery which can be reversibly charged/discharged. In each of the electrolyte solutions, as the concentration of salt is increased, the charge/discharge efficiency tends to improve. This is assumed to be due to the fact that as the concentration of salt is increased, the equilibrium potential shifts to a higher level, thereby preventing the generation of hydrogen. When the concentration of lithium salt was 3 M or more, the maximum charge/discharge efficiency and the cycle life were excellent, compared to when the concentration was less than 3 M. It is confirmed that, particularly, when an electrolyte solution prepared by dissolving lithium chloride at a concentration of 9 M or more is used, the capacity is decreased, however a high charge/discharge efficiency is achieved.

As seen from Examples 24 and 25, when the anatase type $TiO_2$ is used, charge/discharge can be reversibly performed.

The equilibrium potential is high as compared to the system using $Li_4Ti_5O_{12}$, whereby a high efficiency and a long life cycle are achieved.

Example 26

As the secondary battery, a two-electrode cell was produced in the following manner.

As the negative electrode, the electrode produced in the same manner as in Example 1 was used. The used positive electrode was produced in the following manner. Lithium manganese ($LiMn_2O_4$) was used as the positive electrode active material, acetylene black was used as the conductive auxiliary agent, and PVdF was used as the binder. The composition in the active material layer had a weight ratio of (the active material:the conductive auxiliary agent:and the binder) 100:10:10. Each powder was added to an N-methyl-2-pyrrolidone solution, which was mixed and stirred to prepare a slurry. The slurry was applied to both sides of a current collector of titanium. Then, the solvent was dried and the current collector was rolled to produce a positive electrode. The density of the electrode was adjusted so that the positive electrode capacity was 1.5 times larger than the negative electrode capacity.

These positive and negative electrodes were used to perform a constant current/voltage charge test and a constant current discharge test on a secondary battery under the conditions (potential range: 2.7 V to 2 V, current value: 10 C, and capacity value for charge termination: 0.17 mAh). An aqueous solution obtained by dissolving lithium chloride (salt) at a concentration of 3.5 M and lithium sulfate (salt) at a concentration of 0.5 M was used as the electrolyte solution.

Based on the amount of electricity (Wh) and the discharge capacity (Ah) calculated from the resulting discharge curve, the average operating voltage was calculated. The resulting maximum average operating voltage was 2.45 V. The cycle number when the capacity retention ratio was 70% relative to the maximum discharge capacity was defined as cycle life.

These results are compiled in Table 3 below. Table 3 show the results of Examples 27 to 29 described below.

Example 27

A secondary battery was produced in the same manner as described in Example 26 except that an aqueous solution obtained by dissolving lithium chloride at a concentration of 9 M was used as the electrolyte solution and the secondary battery was evaluated. The results are shown in Table 3.

Example 28

A secondary battery was produced in the same manner as described in Example 26 except that the anatase type $TiO_2$ was used as the negative electrode active material and the secondary battery was evaluated. The results are shown in Table 3.

Example 29

A secondary battery was produced in the same manner as described in Example 28 except that an aqueous solution obtained by dissolving lithium chloride at a concentration of 9 M was used as the electrolyte solution and the secondary battery was evaluated. The results are shown in Table 3.

TABLE 3

| | Positive electrode active material | Negative electrode active material | Electrolyte solution | Average operating voltage(V) | Cycle life (cyc) |
|---|---|---|---|---|---|
| Example 26 | $LiMn_2O_4$ | $Li_4Ti_5O_{12}$ | LiCl 3.5M + $Li_2SO_4$ 0.5M | 2.45 | 100 |
| Example 27 | $LiMn_2O_4$ | $Li_4Ti_5O_{12}$ | LiCl 9M/$H_2O$ | 2.45 | 200 |
| Example 28 | $LiMn_2O_4$ | $TiO_2$ | LiCl 3.5M + $Li_2SO_4$ 0.5M | 2.15 | 200 |
| Example 29 | $LiMn_2O_4$ | $TiO_2$ | LiCl 9M/$H_2O$ | 2.15 | 300 |

As shown in Table 3, the battery produced by using $Li_4Ti_5O_{12}$ as the negative electrode active material had an average operating voltage of 2.45 V. Further, the battery produced by using the anatase type $TiO_2$ as the negative electrode active material had an average operating voltage of 2.15 V. These average operating voltages are higher than those of a lead storage battery and a nickel-hydrogen battery. Hence, the secondary batteries according to these examples achieve a high energy density. Further, an excellent cycle life performance was achieved such that the cycle life was 100 times or more. In the case of using the anatase $TiO_2$ as the negative electrode active material, the equilibrium potential becomes high, whereby the cycle life tends to increase. In the case of using a high concentration of lithium chloride as the electrolyte solution, the charge/discharge efficiency of the negative electrode is high, thereby achieving an excellent cycle life.

According to at least one of the embodiments, the negative electrode includes an aluminum-containing negative electrode current collector and a boehmite-containing cover layer, and the boehmite-containing cover layer is provided on at least a part of a surface of the negative electrode current collector, and has the thickness of 10 nm to 1000 nm. Accordingly, it is possible to suppress the peeling of the active material layer from the negative electrode current collector. As a result, an excellent cycle life performance can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode;
a negative electrode; and
an electrolyte comprising a water-containing solvent and a lithium ion,
wherein the negative electrode comprises an aluminum-containing negative electrode current collector and a boehmite-containing cover layer, and
the boehmite-containing cover layer is provided on at least a part of a surface of the negative electrode current collector, and has a thickness of 10 nm to 450 nm.

2. The secondary battery according to claim 1, wherein a portion with the cover layer provided on the surface of the negative electrode current collector shows a peak originated from an Al—O bond of the boehmite within a range of $350\pm20$ cm$^{-1}$ in a spectrum obtained by micro-Raman spectroscopy using a light source with a wavelength of 532 nm.

3. The secondary battery according to claim 1, wherein the cover layer has a thickness of 100 nm to 450 nm.

4. The secondary battery according to claim 1, wherein a concentration of the lithium ion in the electrolyte is from 3 M to a saturated concentration.

5. The secondary battery according to claim 1, wherein the lithium ion is a cation derived from a lithium salt, and the lithium salt is at least one selected from the group consisting of lithium chloride, lithium nitrate, and lithium sulfate.

6. The secondary battery according to claim 1, wherein the electrolyte has a pH of 2 to 12.

7. The secondary battery according to claim 1, wherein the negative electrode comprises an active material which comprises at least one selected from the group consisting of a spinel lithium titanium oxide and an anatase titanium oxide.

8. The secondary battery according to claim 1, wherein the negative electrode comprises a negative electrode active material layer, and the cover layer is formed on a whole surface opposite to the negative electrode active material layer on the surface of the negative electrode current collector.

9. A battery pack comprising the secondary battery according to claim 1.

10. The battery pack according to claim 9, further comprising: an external power distribution terminal; and a protective circuit.

11. The battery pack according to claim 9, comprising a plural of the secondary batteries, wherein the secondary batteries are electrically connected in series, in parallel, or in a combination of in series and in parallel.

12. A vehicle comprising the battery pack according to claim 9.

13. The vehicle according to claim 12, wherein the battery pack is configured to recover a regenerative energy caused by power of the vehicle.

\* \* \* \* \*